United States Patent
Doken

(10) Patent No.: US 12,335,577 B2
(45) Date of Patent: *Jun. 17, 2025

(54) INTERACTIVE PRONUNCIATION LEARNING SYSTEM

(71) Applicant: Adeia Guides Inc., San Jose, CA (US)

(72) Inventor: Serhad Doken, Bryn Mawr, PA (US)

(73) Assignee: ADEIA GUIDES INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/213,599

(22) Filed: Jun. 23, 2023

(65) Prior Publication Data

US 2023/0345082 A1 Oct. 26, 2023

Related U.S. Application Data

(63) Continuation of application No. 17/502,205, filed on Oct. 15, 2021, now Pat. No. 11,736,773.

(51) Int. Cl.
*H04N 21/488* (2011.01)
*G10L 15/187* (2013.01)
*G10L 15/26* (2006.01)
*H04N 21/485* (2011.01)

(52) U.S. Cl.
CPC ....... *H04N 21/4884* (2013.01); *G10L 15/187* (2013.01); *G10L 15/26* (2013.01); *H04N 21/4856* (2013.01)

(58) Field of Classification Search
CPC .......... H04N 21/4884; H04N 21/4856; G10L 15/26; G10L 15/187
See application file for complete search history.

(56) References Cited

U.S. PATENT DOCUMENTS

| | | | | |
|---|---|---|---|---|
| 4,570,232 A | * | 2/1986 | Shikano | G10L 15/12 704/241 |
| 5,598,557 A | * | 1/1997 | Doner | G06F 16/3346 707/999.005 |
| 6,085,160 A | * | 7/2000 | D'hoore | G10L 15/005 704/277 |
| 6,098,082 A | * | 8/2000 | Gibbon | G06F 16/739 715/255 |
| 6,442,518 B1 | * | 8/2002 | Van Thong | G10L 15/26 704/235 |
| 6,473,778 B1 | * | 10/2002 | Gibbon | G06F 40/103 715/201 |
| 7,035,468 B2 | * | 4/2006 | Yogeshwar | G06F 16/71 707/E17.031 |

(Continued)

*Primary Examiner* — Michael B. Pierorazio
(74) *Attorney, Agent, or Firm* — HALEY GUILIANO LLP

(57) ABSTRACT

Systems and methods for generating audible pronunciation of a closed captioning word in a content item. For example, a system generates for output on a first device a content item comprising dialogue. The system generates for display on the first device a closed captioning word corresponding to the dialogue where the closed captioning word is selectable via a user interface of the first device. The system receives a selection of the closed captioning word via the user interface of the first device. In response to receiving the selection of the closed captioning word, the system generates for playback on the first device at least a portion of the dialogue corresponding to the selected closed captioning word.

20 Claims, 15 Drawing Sheets

(56) References Cited

U.S. PATENT DOCUMENTS

| | | | |
|---|---|---|---|
| 7,047,191 B2* | 5/2006 | Lange | G10L 15/26 704/235 |
| 7,065,524 B1* | 6/2006 | Lee | G16H 50/50 706/45 |
| 7,092,888 B1* | 8/2006 | McCarthy | G10L 15/1822 704/277 |
| 7,110,664 B2* | 9/2006 | Yogeshwar | H04N 5/76 386/328 |
| 7,509,385 B1* | 3/2009 | Rittmeyer | G06Q 10/107 715/224 |
| 7,739,253 B1* | 6/2010 | Yanovsky | G06F 16/9535 707/706 |
| 7,761,892 B2* | 7/2010 | Ellis | H04N 21/2143 725/86 |
| 7,908,628 B2* | 3/2011 | Swart | H04N 21/6377 725/135 |
| 8,131,545 B1* | 3/2012 | Moreno | G10L 15/04 704/235 |
| 8,209,724 B2* | 6/2012 | Rathod | H04N 21/435 348/715 |
| 8,248,528 B2* | 8/2012 | Hosking | H04N 7/165 725/62 |
| 11,228,810 B1* | 1/2022 | Arazi | H04N 21/6582 |
| 2002/0055950 A1* | 5/2002 | Witteman | G06F 16/40 707/E17.009 |
| 2002/0093591 A1* | 7/2002 | Gong | H04N 21/2368 348/E7.063 |
| 2003/0025832 A1* | 2/2003 | Swart | H04N 21/4828 348/E7.071 |
| 2003/0061028 A1* | 3/2003 | Dey | G06F 16/40 704/9 |
| 2003/0169366 A1* | 9/2003 | Lenzi | H04N 7/10 348/461 |
| 2003/0206717 A1* | 11/2003 | Yogeshwar | G11B 27/10 386/328 |
| 2004/0096110 A1* | 5/2004 | Yogeshwar | G06F 16/51 707/E17.031 |
| 2005/0227614 A1* | 10/2005 | Hosking | H04N 7/165 455/3.06 |
| 2006/0015339 A1* | 1/2006 | Charlesworth | G10L 15/187 704/E15.02 |
| 2007/0124147 A1* | 5/2007 | Gopinath | G10L 15/19 704/E15.021 |
| 2007/0124788 A1* | 5/2007 | Wittkoter | H04N 7/165 348/E7.071 |
| 2008/0066138 A1* | 3/2008 | Bishop | G06F 40/58 725/137 |
| 2008/0262996 A1* | 10/2008 | Yogeshwar | G06F 16/71 707/E17.031 |
| 2008/0266449 A1* | 10/2008 | Rathod | H04N 21/8133 348/E7.001 |
| 2009/0171662 A1* | 7/2009 | Huang | G10L 15/1822 704/E15.041 |
| 2019/0303797 A1* | 10/2019 | Javali | G10L 15/22 |
| 2022/0059082 A1* | 2/2022 | Saon | G06F 17/18 |
| 2022/0093103 A1* | 3/2022 | Shin | G06F 40/106 |
| 2022/0223066 A1* | 7/2022 | Chen | G10L 15/16 |
| 2023/0124847 A1 | 4/2023 | Doken | |

* cited by examiner

1002

```
Generate for output on a first device a content item comprising dialogue
```

1004

```
Generate for display on the first device a closed captioning word
corresponding to the dialogue
```

1006

```
Receive a selection of the closed captioning word via the first device
```

1008

```
Generate for playback on the first device at least a portion of the dialogue
corresponding to the selected closed captioning word
```

1000      FIG. 10

```
WEBVTT
X-TIMESTAMP-MAP=MPEGTS:63000, LOCAL:00:00:00.000

1
00:00.100 --> 00:00:400
Wait and see when we're through.
@pronunciation "Wait" -> Audio File "for wait" , 00:00.100- 00:00.100.567
<start and end timestamp>
@pronunciation "and see" -> Audio File for "and see", its range timestamp
@pronunciation "when we're" -> Audio File for "when we're", its range
timestamp
@pronunciation " through" -> Audio File for "through", its range timestamp
```

1200      FIG. 12

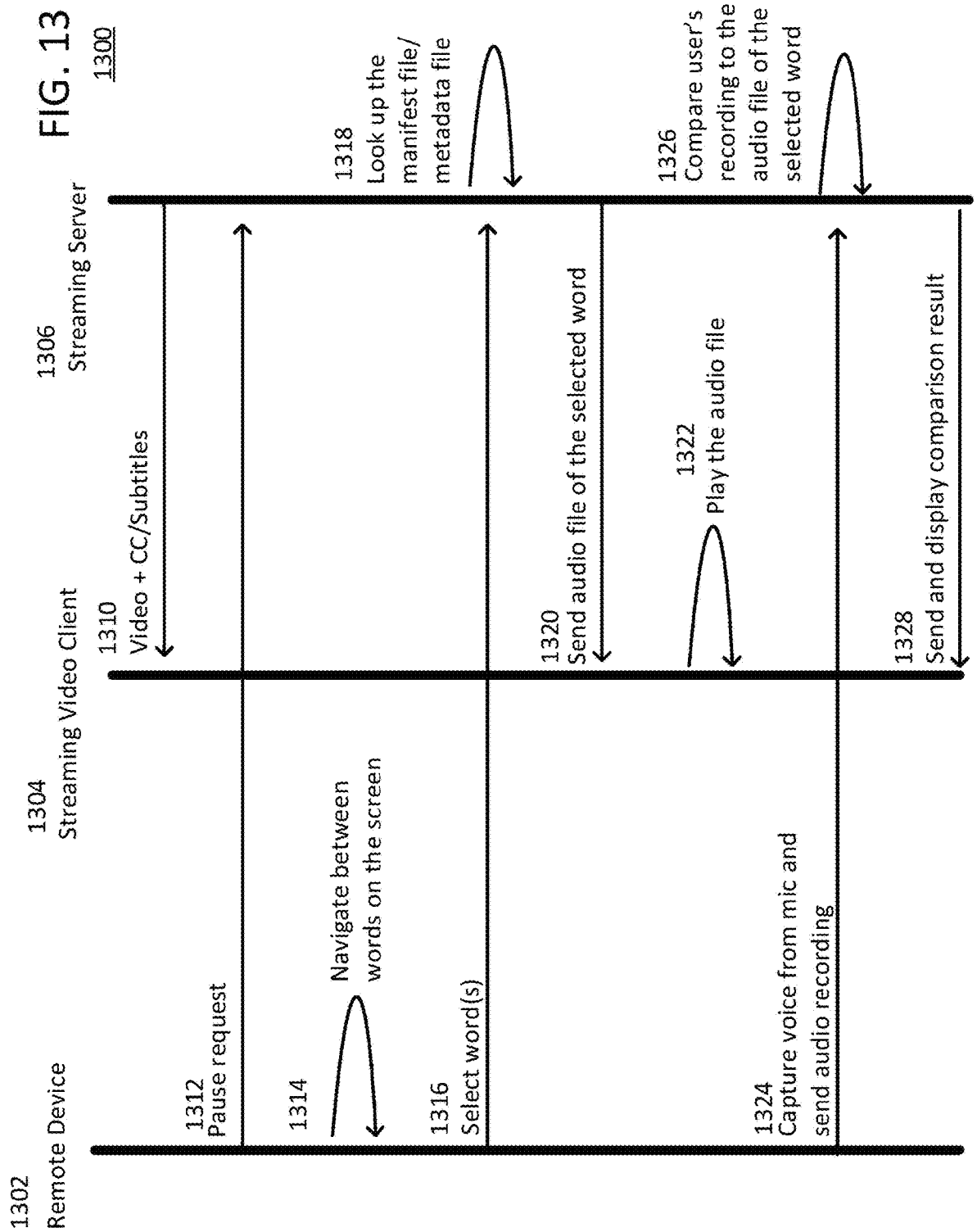

INTERACTIVE PRONUNCIATION LEARNING SYSTEM

CROSS-REFERENCE TO RELATED APPLICATIONS

This application is a continuation of U.S. patent application Ser. No. 17/502,205, filed Oct. 15, 2021. The disclosure of which is hereby incorporated by reference herein in its entirety.

BACKGROUND

It has been challenging for a non-native speaker to learn a foreign language. It has been particularly challenging to pick up the correct pronunciation of a word as a native speaker would pronounce it. What has been effective in learning the correct pronunciation is by watching content items (e.g., movies or shows) in the native language because it helps the non-native speaker to learn the pronunciation as the native speaker would pronounce it or to learn the pronunciation of the everyday language or slang, which may not be taught in classes or books.

During the playback of the media, the media service allows subtitles or closed captions to be displayed along with the video so that the non-native speaker can read the text of the dialogue while listening to the dialogue. That way, the non-native person can match a word to the correct pronunciation. However, certain words may be spoken too quickly in that the non-native speaker may not be able to fully grasp the word, or the non-native speaker may want to hear it multiple times in order to comprehend the pronunciation of the word perfectly. If the non-native speaker misses the word and may want to listen to it later, then the non-native speaker would have to look up an online dictionary to hear the pronunciation. However, the non-native speaker may prefer to hear it the way an actor or actress pronounces the word in the movie rather than hearing it in a robotic voice that is often offered by an online dictionary application. Also, the non-native speaker may prefer to hear and practice the word while watching the show rather than practicing it after the show. That way, the non-native speaker can remember the pronunciation of the word the way it is pronounced in the show while it is still fresh in the non-native speaker's memory.

SUMMARY

To overcome such issues, methods and systems are described herein for a pronunciation learning support system that provides real-time audible pronunciation of a word corresponding to a dialogue upon a user selection of a closed captioning word or a word in the subtitles. For example, a system receives a request to present a content item (e.g., a movie) for display on a device (e.g., TV). In some embodiments, the system retrieves metadata of the content item, which includes the dialogue and respective timestamp information corresponding to each word in the dialogue. The system also retrieves a closed captioning file corresponding to the dialogue from a database of the content item. The metadata of the content item is compared to the retrieved closed captioning file corresponding to the dialogue. The system displays the closed captioning words along with the video of the content item.

In some embodiments, the closed captioning words are selectable via the user input interface of the device. Upon a user selection, the system retrieves an audio file associated with the selected closed captioning word and generates for playback a portion of the dialogue corresponding to the selected closed captioning word. The system provides audible pronunciation of the selected closed captioning word.

The user may practice pronouncing the word by uttering the word after the system outputs audible pronunciation of the selected word. In one embodiment, the user may use a second device (e.g., mobile phone) remote from a display device (e.g., TV) that is close to the display device. Any device capable of receiving voice input and transmitting the voice input to the streaming server or media application server is suitable for use as a second device.

A second device (e.g., voice assistant device) remote from the first device (e.g., display device) may capture the user's voice and creates a temporary audio file for the captured voice input. The temporary audio file may be in any audio file format such as the waveform audio file (e.g., .wav) and is transmitted to the server for pronunciation analysis.

The system may compare the temporary file corresponding to the captured word to an audio file containing audible pronunciation of the selected word. The audio file may be retrieved from the database of the content item. The audio file includes audible pronunciation in the standard accent in a particular language or in a particular style that is pronounced in the content item. The system compares the temporary audio file corresponding to the captured word to an audio file containing audible pronunciation of the selected word to calculate a similarity score.

A similarity score may indicate a level of similarity between the user's pronunciation and standard pronunciation. The higher the similarity score is, the more likely the user's pronunciation is close to the standard pronunciation of the particular word. In some embodiments, a similarity score indicates a level of similarity between the user's pronunciation and the pronunciation of a particular style uttered in the content item—the way the character in the content item pronounces a word.

In some embodiments, if a similarity score is over a certain threshold (e.g., 70%), then the system may indicate in the user interface with positive feedback that the user has done a great job with the pronunciation. Real-time feedback may be generated for display with details, such as comparison point or practice history (e.g., You are improving! Better than yesterday."). The feedback may also provide tips for pronouncing the word (e.g., "Try to enunciate each word.").

The present disclosure provides an interactive pronunciation learning system that prompts real-time user selection of a closed captioning word that enables playback of the audible pronunciation of the selected word the way a character of the content item pronounces it and provides real-time feedback by comparing user's recording of the word to an audio file of the selected word uttered by the character. The present disclosure further addresses the problems described above by, for example, saving the network bandwidth and reduces network traffic by reducing the need to send multiple requests to route to a different online language learning source (e.g., online dictionary for pronunciation) for learning the pronunciation.

It should be noted that the systems, methods, apparatuses, and/or aspects described above may be applied to, or used in accordance with, other systems, methods, apparatuses, and/or aspects described in this disclosure.

DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 10 depicts a flowchart of a process for providing audible pronunciation of a closed captioning word, in accordance with some embodiments of the disclosure;

FIG. 12 depicts an exemplary algorithm of generating audio files for words in a dialogue specified within a WebVTT format, in accordance with some embodiments of the disclosure;

FIG. 13 depicts an exemplary flow for providing feedback to a user's recording, in accordance with some embodiments of the disclosure;

DETAILED DESCRIPTION

Figure 1:
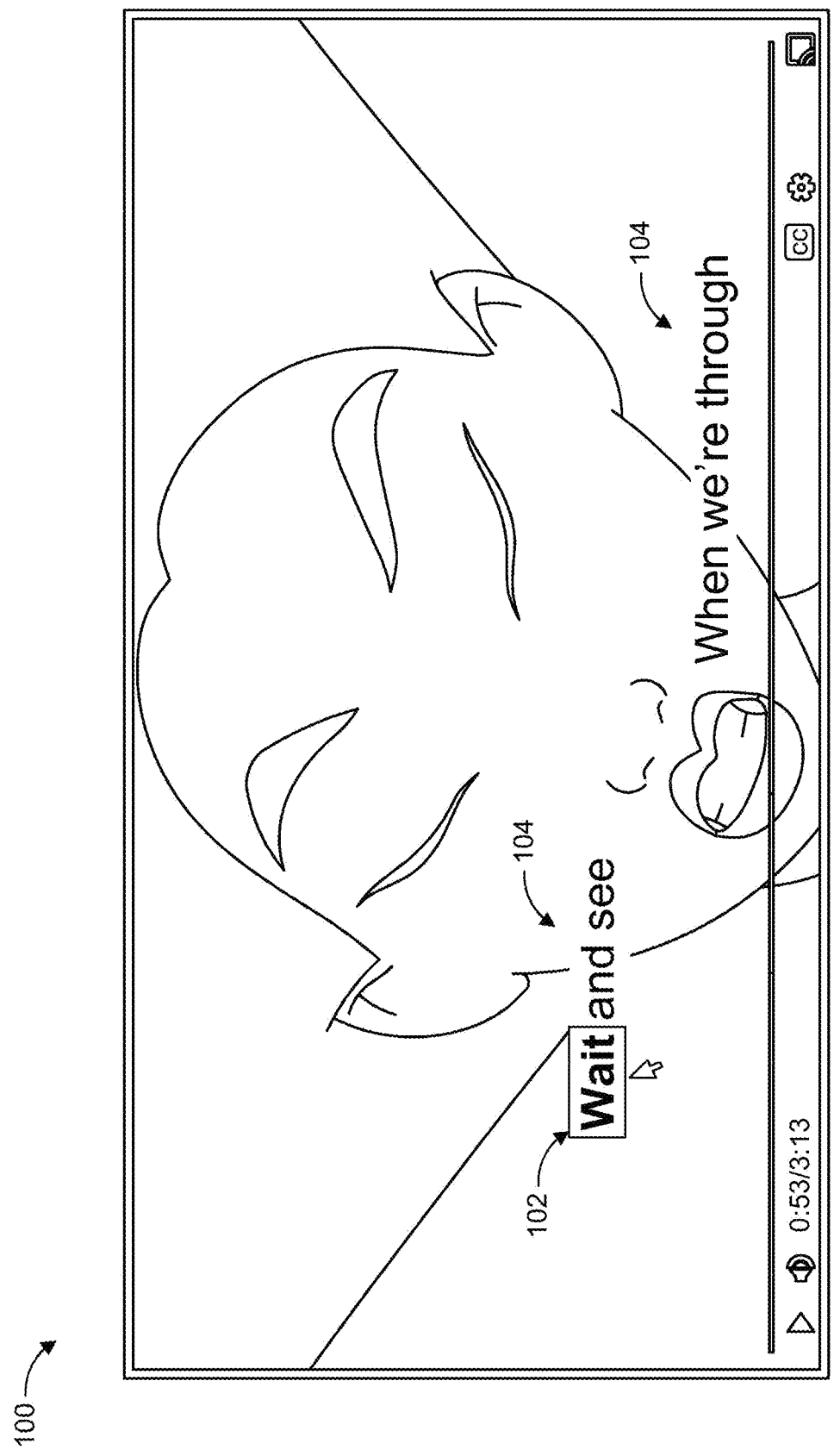
FIG. 1 depicts an exemplary user interface of a content item with a highlighted closed captioning word, in accordance with some embodiments of the disclosure.

FIG. 1 depicts an exemplary user interface 100 of a content item with a highlighted closed captioning word 102, in accordance with some embodiments of the disclosure. For example, the content item (e.g., "Mulan" movie) is presented via a media application on a user device in response to a user request to display the content item. The media application may be a stand-alone application implemented on user equipment devices 1414a, 1414b, 1414c of FIG. 14. In some embodiments, the processes and embodiments described herein may be performed by a media application server 1404 of FIG. 14 or a streaming server 1306 of FIG. 13.

The media application retrieves metadata of the content item from a database of the content item. The metadata of the content item may comprise the dialogue and a respective timestamp corresponding to each word in the dialogue. The media application may also retrieve a closed captioning word file corresponding to the dialogue from a database of the content item. The media application compares the metadata of the content item to the closed captioning word file corresponding to the dialogue. Based on the comparison, the media application determines that at least the portion of the dialogue corresponds to the selected closed captioning word.

In some embodiments, a video of the content item is displayed with closed captioning words corresponding to dialogue 104 (e.g., "wait and see when we're through") spoken in the first language (e.g., English). In some embodiments, the closed captioning words are selectable via a user interface of a computing device (e.g., mobile device) remote from a display device (e.g., TV) that displays the content item. For example, the closed captioning word may be selected via any type of input device such as a keyboard, mouse, or touchscreen. In some embodiments, the selection of the closed captioning word is made via the display (e.g., tablet PC).

In response to receiving the selection of the closed captioning word, the media application highlights the selected word 102 and generates for playback at least a portion of the dialogue corresponding to the selected closed captioning word. As shown in FIG. 1, the selection was made for the closed captioning word "wait" 102. Accordingly, an audible pronunciation of the selected closed captioning word (e.g., "wait") will be played.

In some embodiments, the audible pronunciation of the selected closed captioning word is different from the standard pronunciation of the selected word. For example, pronunciation may vary drastically based on how the word is pronounced by a particular character in the content item or the contextual situation of the scene. For example, the intensity of how the word is said (e.g., angry v. sad), the pitch of the voice (e.g., female character v. male character), the intonation of the speech (e.g., the hometown of the character or hometown of the actor/actress), or how quickly the word is being said (e.g., urgent scene), all of which may play a part in varied pronunciation of a particular word. The present disclosure allows the users to hear the pronunciation of a particular word in a way that it is pronounced in a content item and learn the pronunciation of a word as a character in the content item would pronounce it.

In some embodiments, the playback of the content item is paused when a user selection of a closed captioning word is received. For example, when a user selects "wait" 102 in the closed captioning words, the playback of a video of the content item may be paused to play the pronunciation of the selected word. The user may also send a request to pause the video before selecting a closed captioning word.

Figure 2:
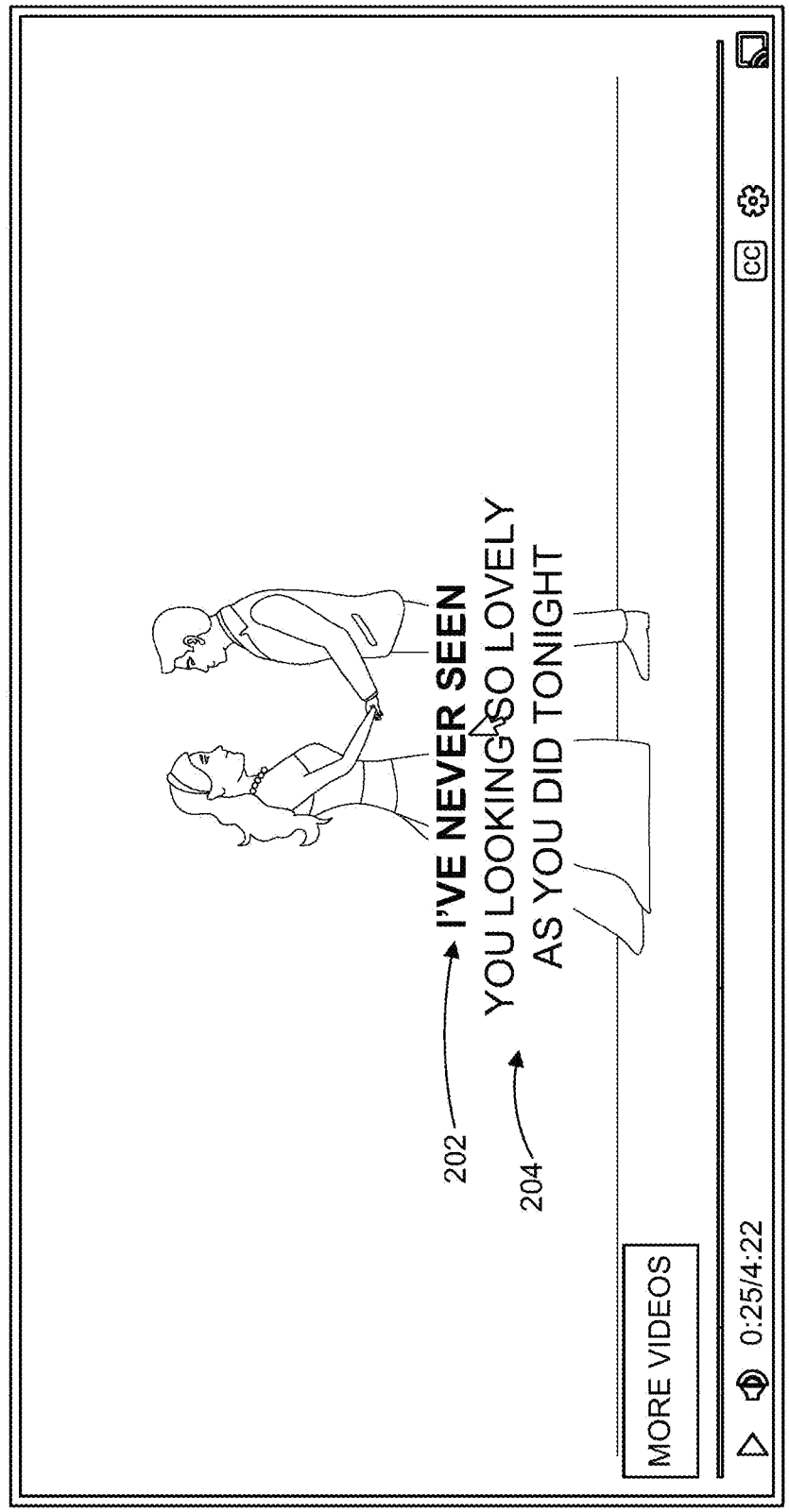
FIG. 2 depicts an exemplary user interface of a content item with a highlighted closed captioning phrase, in accordance with some embodiments of the disclosure.

FIG. 2 depicts an exemplary user interface 200 of a content item with a highlighted closed captioning phrase 202, in accordance with some embodiments of the disclosure. In some embodiments, a selection may be made for a single word or multiple words. If a selection was made for a phrase (multiple words), then the media application may highlight a phrase comprising a plurality of words instead of highlighting a single word. Humans utter generally 100-130 words per minute and may utter multiple words at the same time. Therefore, a listener may hear the pronunciation of a single phrase rather than the individual words. In this case, an end time of a word may be temporally too close to a start time of a subsequent word (e.g., ⅓ second apart). This may deter the listener from discerning individual words, and the listener may not be able to pinpoint a particular word that the listener wants to hear again in the closed captioning words. Alternatively, the system may only allow more than one word to be selected by the user.

In one example, if the user selects "I've," the system may highlight a phrase (e.g., "I've never seen") instead of highlighting only the selected word ("I've") because "I've never seen" is a collection of words that is often uttered together. In another embodiment, the media application determines the temporal proximity of the first set of words ("I've never seen") 202 in the dialogue 204. If the temporal proximity of each word of the first set of words is less than a threshold (e.g., the user utters "I've never seen" too fast, so the end time of "never" and the start time of "seen" is less than a threshold of 0:00:002), the media application categorizes the first set of words as a first phrase. When the media application receives a selection of at least one word (e.g., "never") of the first set of words (e.g., "I've never seen") via the user interface of the user device, the media application retrieves an audio file or multiple audio files containing audible pronunciation of the first phrase ("I've never seen"). The media application generates for output the audible pronunciation of the first phrase. In this case, the first set of words will be played sequentially for those adjacent words.

Figure 3:
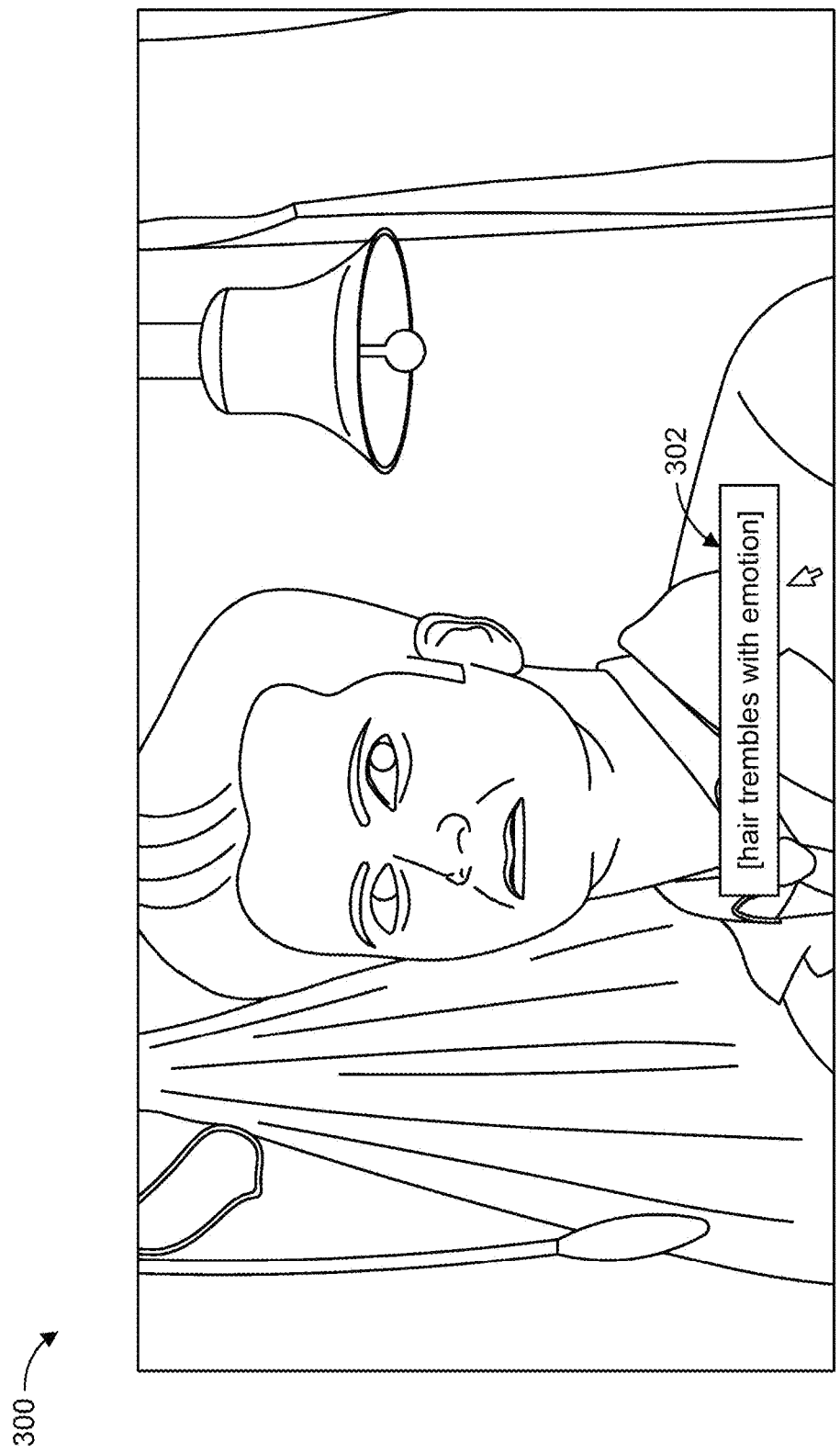
FIG. 3 depicts an exemplary user interface of a content item with non-speech information, in accordance with some embodiments of the disclosure.

FIG. 3 depicts an exemplary user interface 300 of a content item with non-speech information 302, in accordance with some embodiments of the disclosure. The non-speech information may include non-dialogue, such as a description of the background scene (e.g., "hair trembles with emotion"). Non-speech information may be available for the hearing impaired listeners to give the context of the scene (e.g., somber music). In some embodiments, the non-speech information may be greyed out or marked in a way that it is clear to the user that the displayed non-speech information is not part of the dialogue. In exemplary user interface 300, the non-speech information 302 is displayed within a bracket. The non-speech information 302 may not be selectable by the user as these words are not part of the dialogue that the character in the content item uttered. In some embodiments, the non-speech information may be available as an audio file to be output in a voice other than the character who appeared in the content item.

Figure 4:
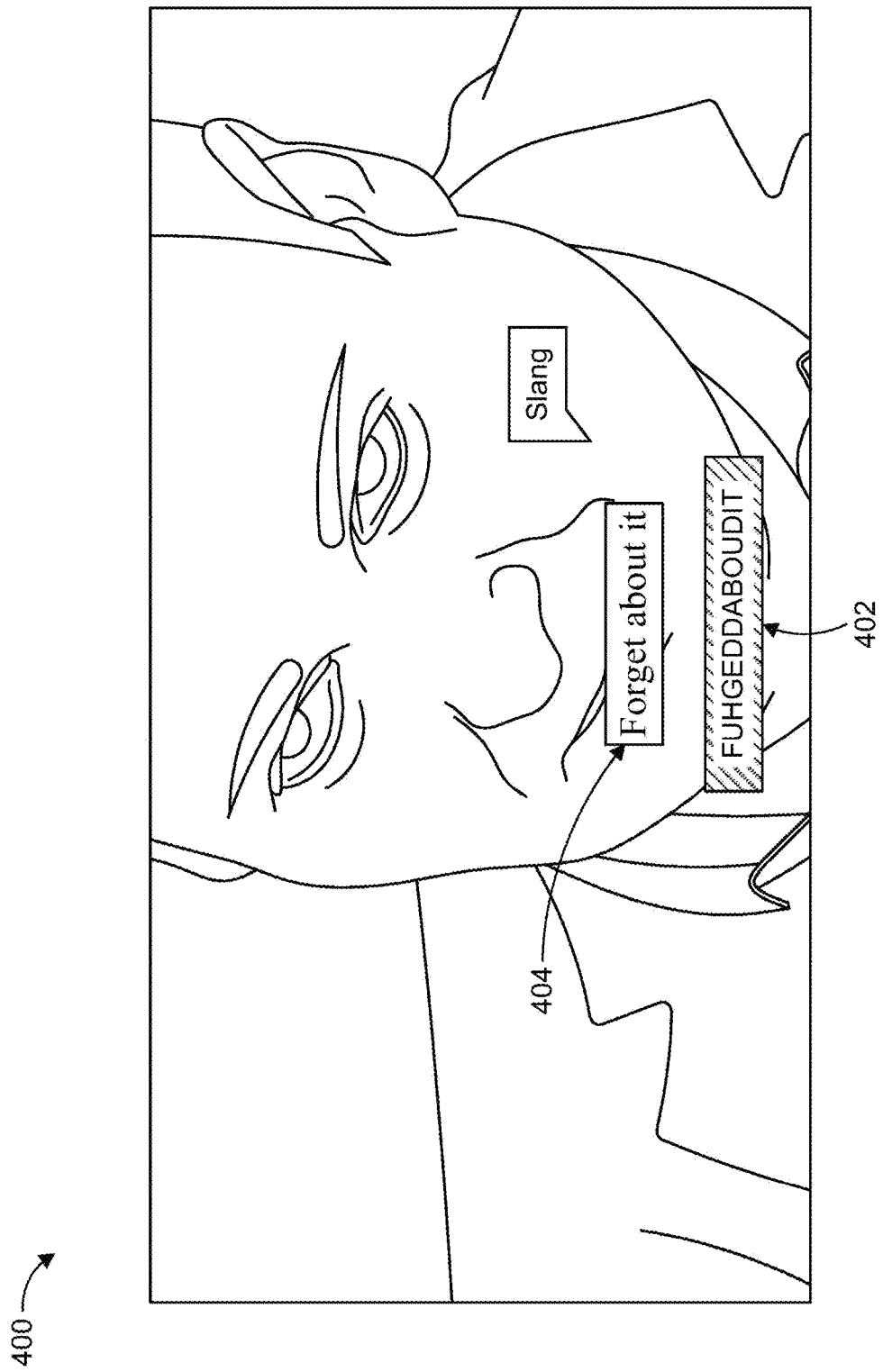
FIG. 4 depicts an exemplary user interface of a content item with a slang, in accordance with some embodiments of the disclosure.

FIG. 4 depicts an exemplary user interface of a content item 400 with a slang 402, in accordance with some embodiments of the disclosure. Some movies include certain words that are pronounced by the characters in a particular way that is different from the typical way that the words are pronounced, such as by having different intonation, pitch, or tone. Some users like how the word is pronounced by these characters and want to hear and practice the word the way the characters in the movies pronounce it. Because these slangs make the pronunciation unique, the slang may appear in the video with the actual words. For example, in exemplary user interface 400, the slang word 402 (e.g., "Fuhgedaboudit") may be displayed with an actual word 404 (e.g., "Forget about it"). In some embodiments, the slang word 402 ("Fuhgeddaboudit") may be visually distinguishable from the actual word 404 ("Forget about it") in that the slang words are highlighted in different colors or are displayed in different fonts than the actual words are displayed. The present disclosure allows the users to hear the pronunciation of a particular word the way it is pronounced in a content item, thereby allowing the user to learn the unique pronunciation of the word like a native speaker or a character in the content item and carrying out the distinct audio characteristics such as emotion, pitch, tone, pause, or intonation.

Figure 5:
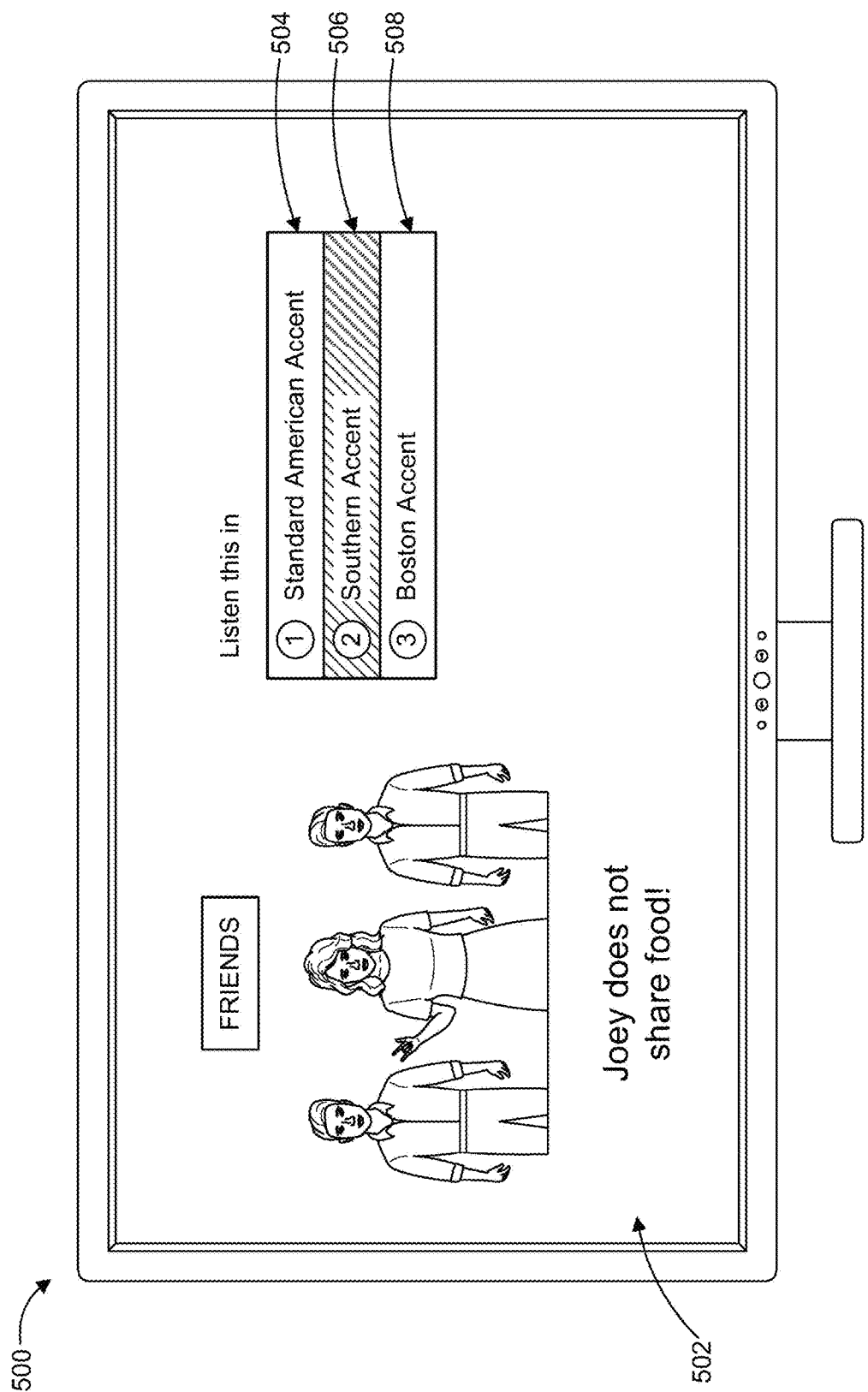
FIG. 5 depicts an exemplary user interface of a content item with a list of one or more pronunciation styles, in accordance with some embodiments of the disclosure.

FIG. 5 depicts an exemplary user interface 500 of a content item with a list of one or more pronunciation styles 504, 506, 508, in accordance with some embodiments of the disclosure. For example, if a user selects a word or phrase "Joey does not share food" 502 from the show "Friends," the media application identifies a plurality of pronunciation styles in the first language that is stored in a database. In exemplary user interface 500, standard American accent 504, Southern accent 506, Boston accent 508 are available for the phrase "Joey does not share food" 502. The media application generates for display a list of the plurality of pronunciation styles 504, 506, 508 on the first device. Although exemplary user interface 500 displays particular accents as different pronunciation styles, any dialect or any type of varied pronunciation style may be used. The media application receives a selection of a pronunciation style of the plurality of pronunciation styles. In this exemplary user interface 500, Southern accent 506 was selected. The media application retrieves an audio file containing audible pronunciation of the selected word in the selected style (e.g., Southern accent). The media application generates for output audible pronunciation of the selected word in the selected style.

Figure 6:
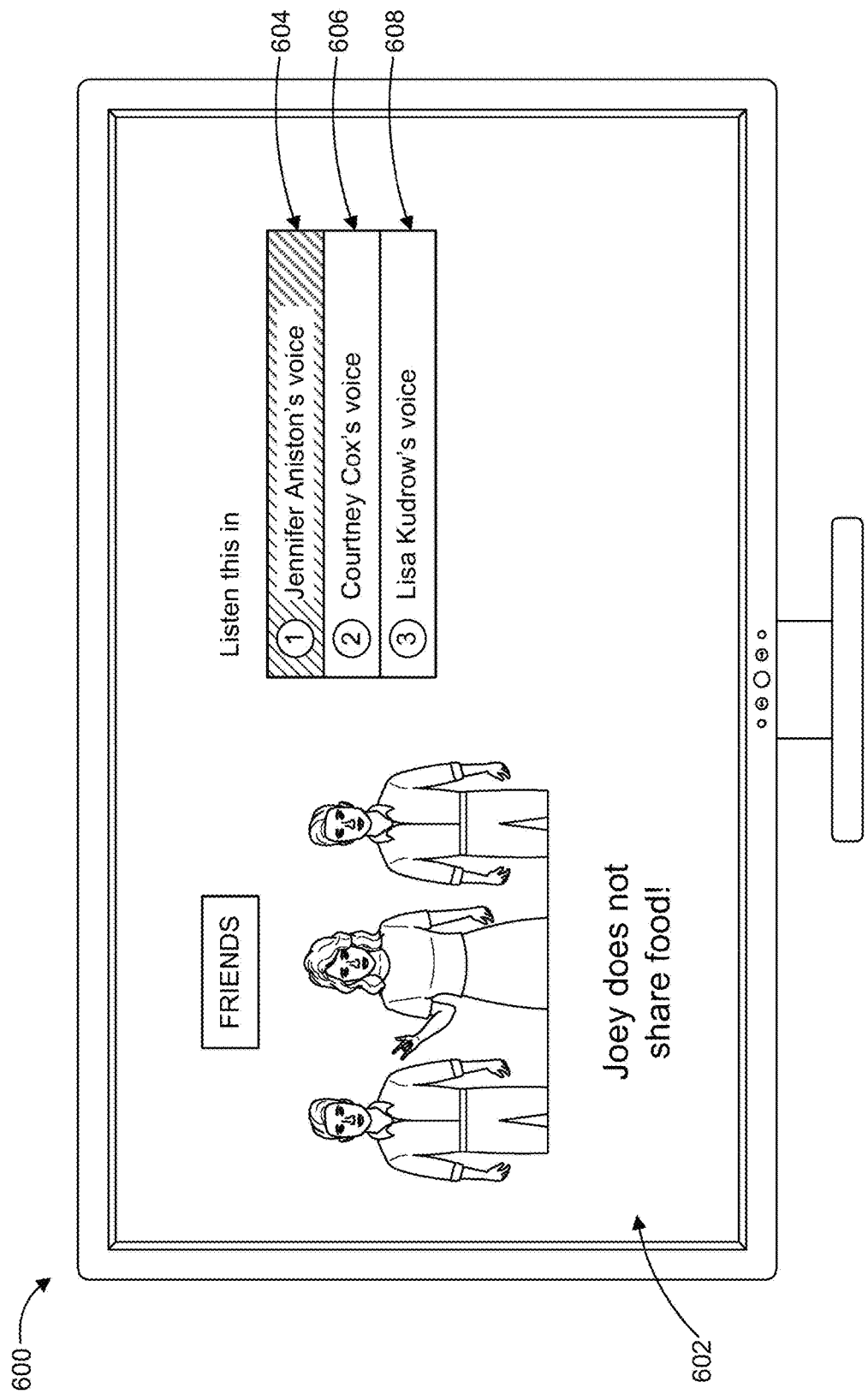
FIG. 6 depicts an exemplary user interface of a content item with a list of one or more characters who uttered a closed captioning word, in accordance with some embodiments of the disclosure.

FIG. 6 depicts an exemplary user interface 600 of a content item with a list of one or more characters 604, 606, 608 who uttered the closed captioning word, in accordance with some embodiments of the disclosure. For example, if a user selects a word or phrase "Joey does not share food" 602 from the show "Friends," the media application identifies whether one or more characters speak the selected word or phrase of the content item by querying the database of the content item. If audio files of "Joey does not share food" are available for one or more characters of the show, then the media application generates for display the exemplary user interface 600 that includes a list of one or more characters of the content item who spoke the selected word or phrase. The media application receives a selection of a character of one or more characters by the user. In this exemplary user interface 600, Jennifer Anniston's voice 604 was selected. The media application retrieves an audio file containing audible pronunciation of the selected word spoken by the selected character (e.g., Jennifer Anniston). The media application generates the retrieved audio file for output containing audible pronunciation of the selected word spoken by the selected character.

Figure 7:
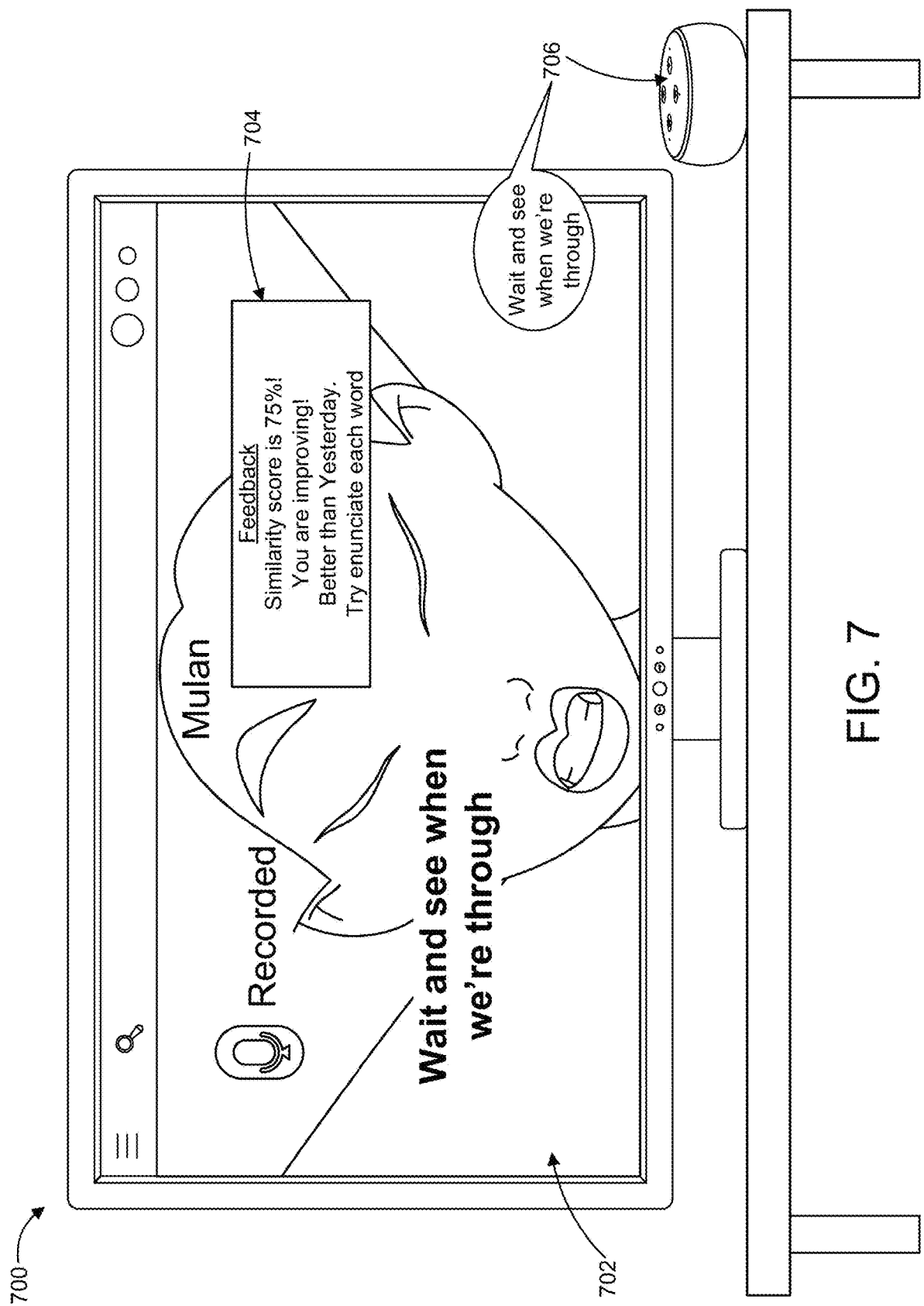
FIG. 7 depicts an exemplary user interface of providing feedback for pronunciation practice, in accordance with some embodiments of the disclosure.

FIG. 7 depicts an exemplary user interface 700 of providing feedback 704 for pronunciation practice, in accordance with some embodiments of the disclosure. Exemplary user interface 700 may be performed in accordance with the exemplary user interfaces 100-500 discussed in FIGS. 1-5. After a user pauses the video to hear the pronunciation of a certain word or phrase 702 (e.g., "wait and see when we're through"), the user may repeat pronouncing the same word. The user may do so by uttering the word after the media application outputs audible pronunciation of the selected word. In one embodiment, the user may use a second device remote from the display device (e.g., TV) such as a mobile phone or a voice assistant device that is close to the display device. Any device capable of receiving voice input and transmitting the voice input to the streaming server or media application server is suitable for use as a second device.

A second device (e.g., voice assistant device) 706 remote from the first device (e.g., display device) may capture the user's voice and creates a temporary audio file for the captured voice. The temporary audio file may be in any audio file format such as the waveform audio file (e.g., .wav) and is transmitted to the server for pronunciation analysis. In some embodiments, the temporary audio file may be analyzed at a client device level by control circuitry 1510 of computing device 1414a, 1414b, 1414c.

The media application may compare the temporary file corresponding to the captured word to an audio file containing audible pronunciation of the selected word. The audio file may be retrieved from the database of the content item. The audio file includes audible pronunciation in the standard accent in a particular language or in a particular style that is pronounced in the content item. The media application compares the temporary audio file corresponding to the captured word to an audio file containing audible pronunciation of the selected word to calculate a similarity score. It may do so by synchronizing the time domain signals between two files and overlaying frequency components, as shown in FIG. 8, which will be explained in detail.

A similarity score may indicate a level of similarity between the user's pronunciation and standard pronunciation. The higher the similarity score is, the more likely the user's pronunciation is close to the standard pronunciation of the particular word. In some embodiments, a similarity score indicates a level of similarity between the user's pronunciation and the pronunciation of a particular style uttered in the content item—the way the character in the content item pronounces a word.

In some embodiments, if a similarity score is over a certain threshold (e.g., 70%), then the media application may indicate in the user interface with positive feedback that the user has done a great job with the pronunciation. As shown in exemplary user interface 700, a real-time feedback 704 may be generated for display with details, such as comparison point or practice history (e.g., You are improving! Better than yesterday."). Feedback 704 may also provide tips for pronouncing the word (e.g., "Try to enunciate each word.") Although exemplary feedback 704 was used for illustrative purposes, any kind of feedback regarding improving the pronunciation may work. If the similarity score falls below the threshold, then the media application may include constructive feedback with descriptive details that can help with the pronunciation.

Figure 8:
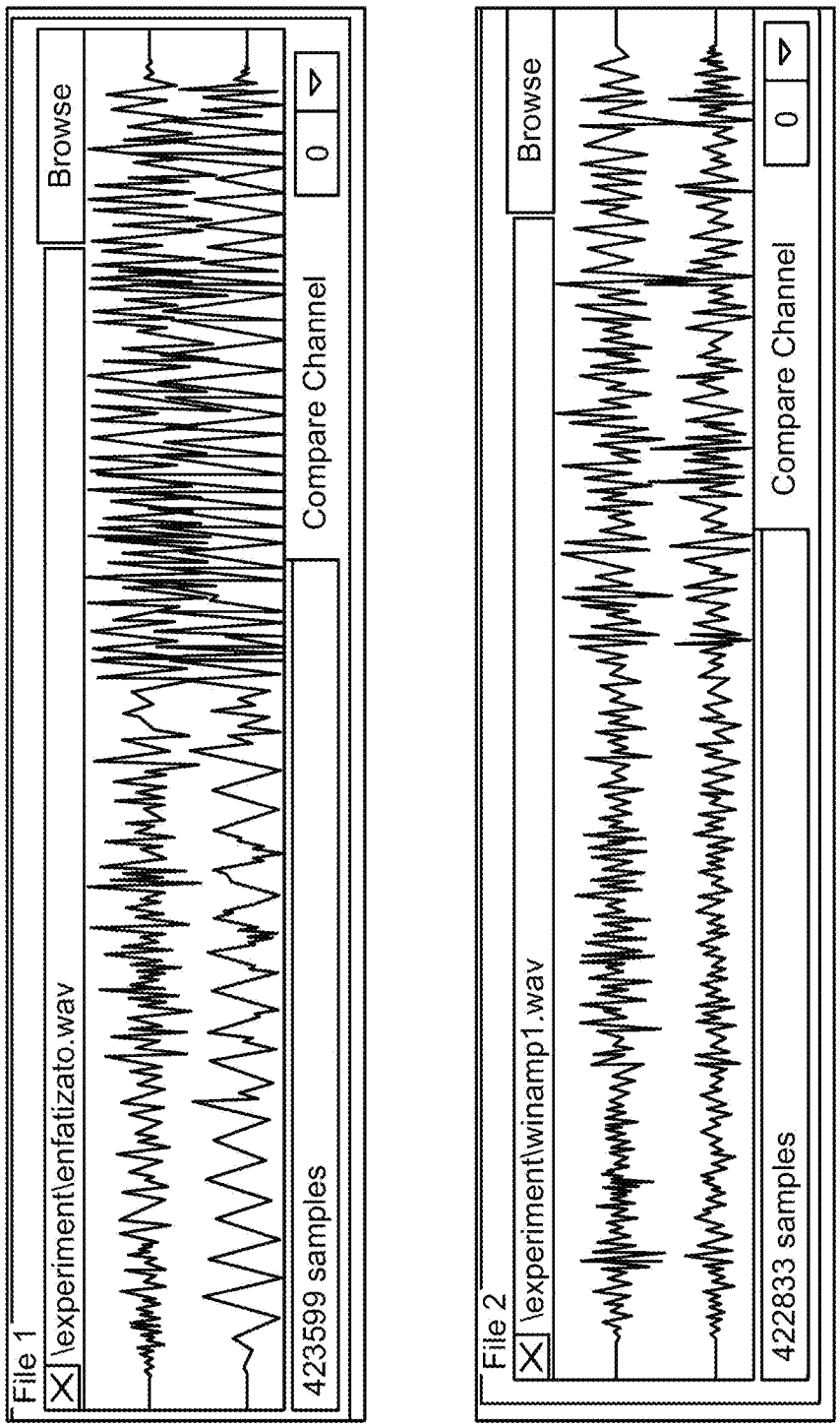
FIG. 8 depicts an exemplary embodiment of synchronizing an actual audio file to user's recording, in accordance with some embodiments of the disclosure.

FIG. 8 depicts an exemplary embodiment of synchronizing an actual audio file to a user's recording in accordance with some embodiments of the disclosure. The media application may synchronize the time domain signals between the files and overlay the frequency components in some embodiments. Based on the comparison, the media application determines how close these two files are. The synchronization and the comparison may be performed by any of the media application, streaming server 1306 of FIG. 13 or media application server 1404 of FIG. 14. In some embodiments, the media application may use Fast Fourier Transform (FFT) algorithms to compute a sequence of signals and converts digital signals to spectral components.

Figure 9:
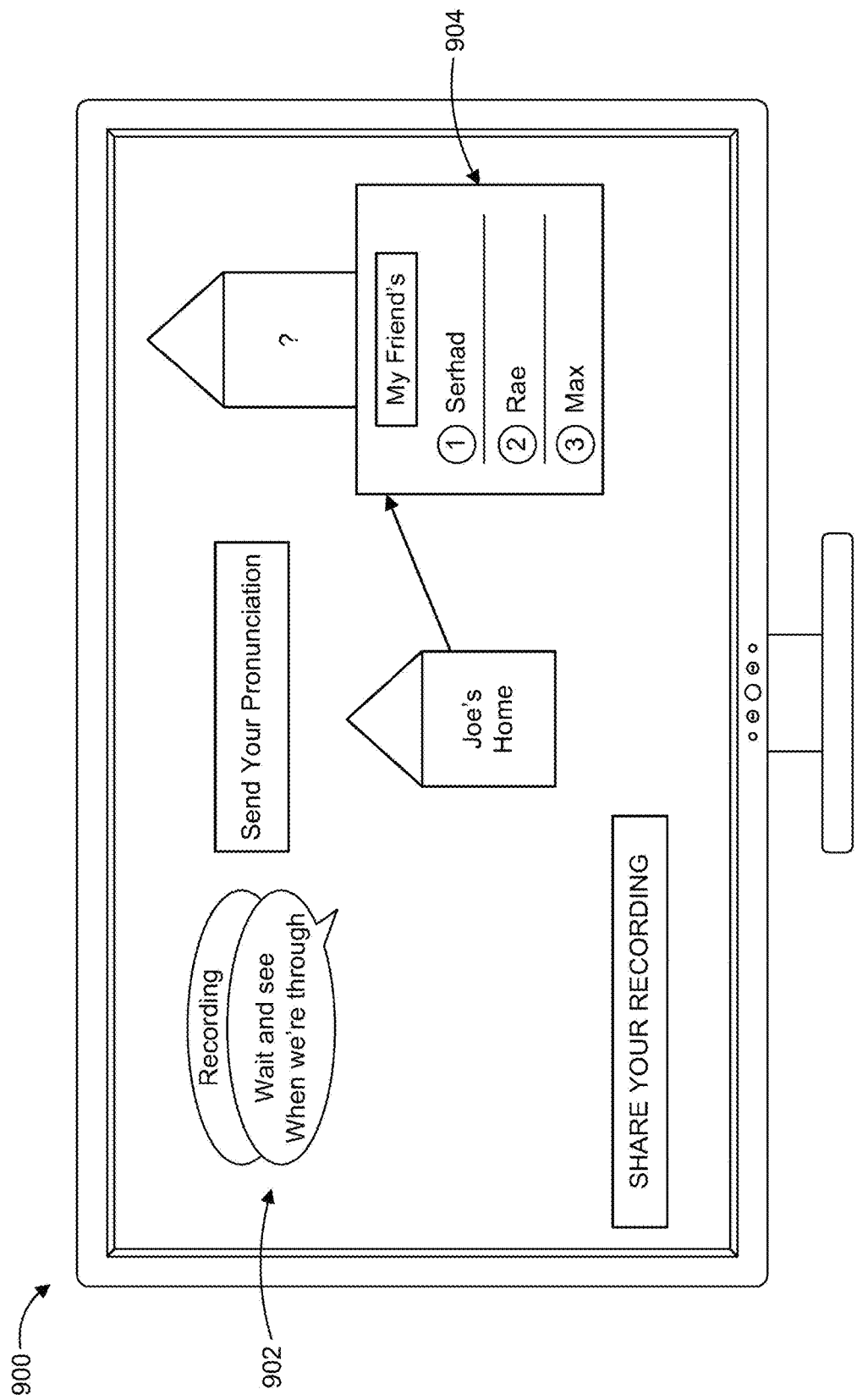
FIG. 9 depicts an exemplary user interface of sharing a pronunciation recording with another user, in accordance with some embodiments of the disclosure.

FIG. 9 depicts an exemplary user interface 900 of sharing a pronunciation recording 902 in accordance with some embodiments of the disclosure. Exemplary user interface 900 may be performed in accordance with the embodiment discussed in connection with FIG. 7. A first user (e.g., Joe) may share his or her recording 902 with other users located in a remote location. For example, after the recording is completed, Joe may select a friend 904 that the user wants to send the recording to (e.g., language teacher or native speaker) and cause the recording to be sent to the user's friend (e.g., Serhad, Rae, Max) by making a selection in the friend's list retrieved from Joe's profile data. The selected user's friend (e.g., Serhad) may perform actions related to the recording, such as playing the recording, rating the recording, providing feedback to the recording, or creating a new recording. The user's friend may send the feedback or a newly-created recording back to Joe for comparison.

FIG. 10 depicts a flowchart of a process 1000 for providing audible pronunciation of closed captioning words, in accordance with some embodiments of the disclosure. It should be noted that process 1000 may be performed by control circuitry 1502, 1510 of FIG. 14 as instructed by the media application that may be performed on any client device. In addition, one or more steps of flowcharts 1100 or 1300 may be incorporated into or combined with one or more steps of any other process of FIG. 10.

At step 1002, control circuitry 1510 generates for output on a first device a content item comprising a dialogue. A content item may be audio-visual content that includes dialogue uttered by a character. At step 1004, control circuitry 1510 generates for display on the first device a closed captioning word corresponding to the dialogue. The closed captioning word may be in the language that is the same as the dialogue. The closed captioning word may be selectable via a user interface of the first device. At step 1006, control circuitry 1510 receives a selection of the closed captioning word via the user interface of the first device (e.g., laptop). Alternatively, a selection of the closed captioning word may be made via the user interface of a second device different from the first device. In some embodiments, a video of the content item is paused. At step 1008, control circuitry 1510 generates for playback on the first device at least a portion of the dialogue corresponding to the selected closed captioning word in response to receiving the selection of the closed captioning word. Control circuitry 1510 generates audible pronunciation of the selected word uttered by the character in the content item. The audible pronunciation has its own audio characteristic, such as tone, intensity, pause, intonation, pitch, or any distinguishable audio attributes that make the pronunciation unique from the standard pronunciation.

Figure 11:
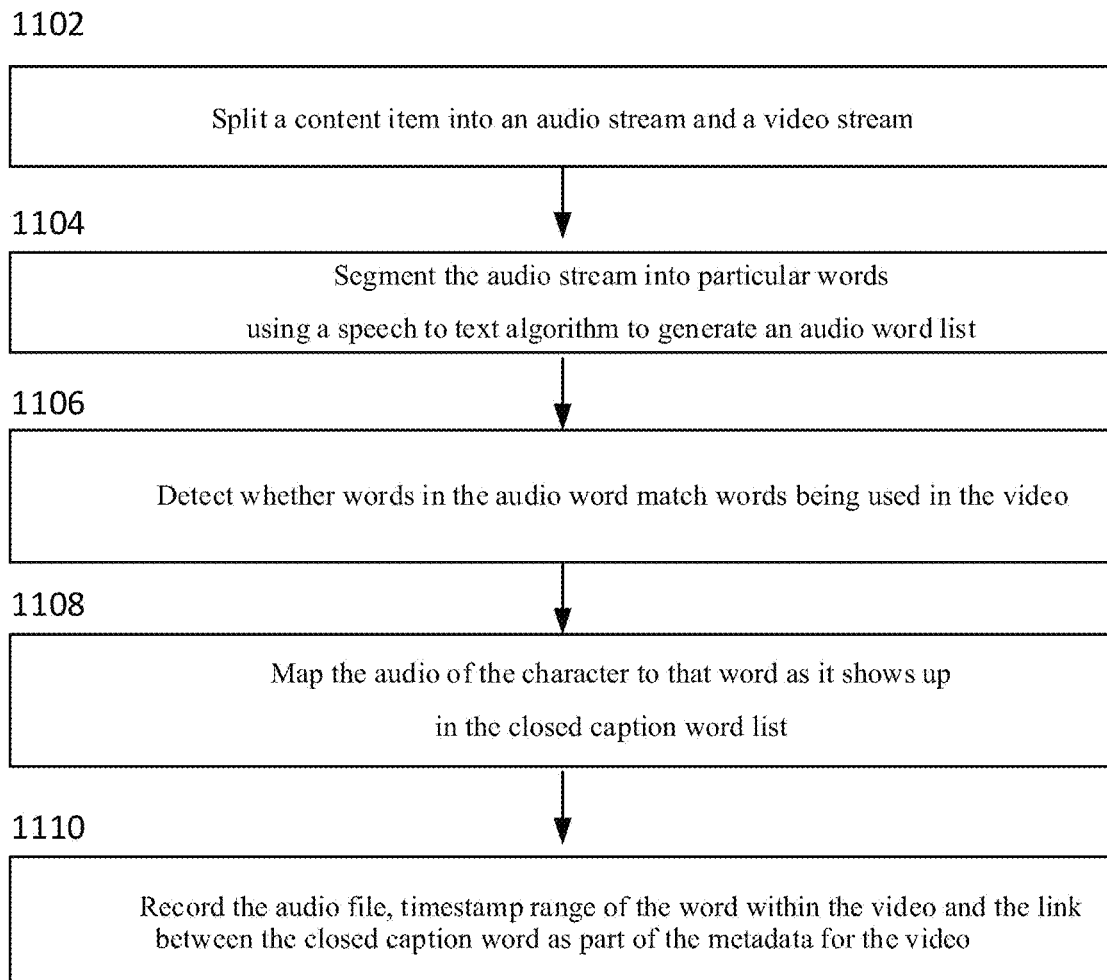
FIG. 11 depicts a flowchart of a process for segmenting a content item and associating timestamps with words in a dialogue, in accordance with some embodiments of the disclosure.

FIG. 11 depicts a flowchart 1100 of a process for segmenting a content item and associating timestamps with words in dialogue, in accordance with some embodiments of the disclosure. It should be noted that process 1100 may be performed by control circuitry 1502, 1510 of FIG. 14 as instructed by the media application that may be performed on any client device. Alternatively, process 1100 may be performed by streaming server 1306 of FIG. 13 or media application server 1404 of FIG. 14. In addition, one or more steps of flowcharts 1000 or 1300 may be incorporated into or combined with one or more steps of any other process of FIG. 11.

At step 1102, control circuitry 1502 splits the content item into an audio stream and a video stream. At step 1104, control circuitry 1502 segments the audio stream of the content item to a sequence of words using a speech-to-text algorithm to generate an audio word list. A speech-to-text algorithm or voice recognition algorithm may be used in generating an audio word list. In some embodiments, metadata of the content item comprising closed caption data is retrieved from a database of the content item. The closed caption data includes a text version of the spoken part of the content item (e.g., dialogue).

At step 1106, control circuitry 1502 detects whether the closed caption data matches the words being used in the video by comparing the closed caption data and the processed video. For example, a speech detection algorithm or image processing technique may be used to decipher or read lips of the character in the video (e.g., a character saying "forget about it") to determine the words that are being used in the video. Additionally, in another embodiment, control circuitry 1502 detects whether words in the audio word list match the words being used in the video.

At step 1108, control circuitry 1502 maps the closed caption data to the audio word list generated from the audio stream using the speech-to-text algorithm at step 1104. Step 1108 may provide an additional degree of confidence that the closed caption data matches not only the video of the content item, but also the audio of the content item. At step 1110, control circuitry 1502 records the audio file, timestamp information (e.g., a time range) of the word identified within the video, and the link between the closed caption word as part of the metadata for the video.

FIG. 12 depicts an exemplary algorithm 1200 for generating audio files for words specified within the Web Video Text Tracks Format (WebVTT) format, according to some embodiments of the disclosure. Exemplary algorithm 1200 includes codes for generating the audio files for the dialogue. An audio file may include a word and associated timestamps information specified within the WebVTT format. For example, the phrase "wait and see when we're through" is spoken from the time range of 0:00.100-0:00.400 for three seconds. The range of the words is kept as tuples of words, and each spoken word is assigned a start timestamp and an end timestamp. The media application may create a new tag for each pronunciation and assign an audio file associated with the pronunciation of the word and the range of timestamps when the utterance appears. As shown in FIG. 12, for the word "wait," a range of timestamps may be assigned with the start timestamp of 0:00:100 and the end timestamp of 0:00:100.567. A newly generated tag for the word "wait" may be associated with the specified start timestamp and the end timestamp.

In some embodiments, the audio files are part of the HLS (HTTP Live Streaming) streaming manifest for SVOD (Subscription Video-On-Demand). The algorithm may be implemented in various formats, such as Secure-Reliable Transport (SRT) or Timed-Text Markup Language (TTML). In some embodiments, the algorithm may be implemented using other streaming protocols such as HLS, MPEG DASH, HSS, HDS, etc.

FIG. 13 depicts an exemplary flow 1300 for providing feedback to a user's recording in accordance with some embodiments of the disclosure. At step 1310, a steaming server transmits a content item with closed captioning words or subtitles to a streaming video client 1304 in response to a user request to display the content item (e.g., a user plays the movie). A streaming server may be a server that provides content items to computing devices over communication network 1412. In some embodiments, a streaming server may be media application server 1404. A streaming video client can be a rendering device such as a TV or laptop. In some embodiments, a streaming video client may be any of computing devices 1414a, 1414b, 1414c. A remote device 1302 can be any device that is capable of providing input, selecting a text, or capturing a vocal input. In some embodiments, streaming video client 1304 and remote device 1302 can be integrated as a single device.

The content item is generated for display on streaming video client 1304. A user may send a request to pause the video to hear the pronunciation of a specific word at step 1312. In some embodiments, streaming video client 1304 may relay the request from remote device 1302 to streaming server 1306. At step 1314, the user may navigate between closed captioning words displayed on a screen of streaming video client 1304. At step 1316, the user may select a word or a phrase within the closed captioning words at remote device 1302 (e.g., by double-clicking a word). In one embodiment, streaming video client 1304 may relay the selection made from remote device 1302 to streaming server 1306. In another embodiment, the selection may be made via a graphical user interface of streaming video client 1304 (e.g., a TV touchscreen). At step 1318, in response to receiving the selection, streaming server 1306 queries for an audio file of the selected word by looking up the manifest or metadata associated with the content item.

At step 1320, streaming server 1306 sends an audio file containing audible pronunciation of the selected word to streaming video client 1304. At step 1322, streaming video client 1304 plays audible pronunciation of the selected word. If the user wishes to practice the pronunciation, the user may repeat the word after streaming video client 1304 plays the word. The pronounced word may be captured as a recording at remote device 1302 and may be sent to streaming server 1306 at step 1324. In one embodiment, streaming video client 1304 may relay the recording file made from remote device 1302 to streaming server 1306. In another embodiment, capturing of the user's pronunciation is performed using a speaker at streaming video client 1304 (e.g., using a speaker of a laptop). At step 1326, streaming server 1306 compares the user's recording to the audio file of the selected word to calculate a similarity score at step 1326. At step 1328, streaming server 1306 transmits the comparison result (e.g., real-time feedback) to streaming video client 1304 based on the calculated similarity score.

Figure 14:
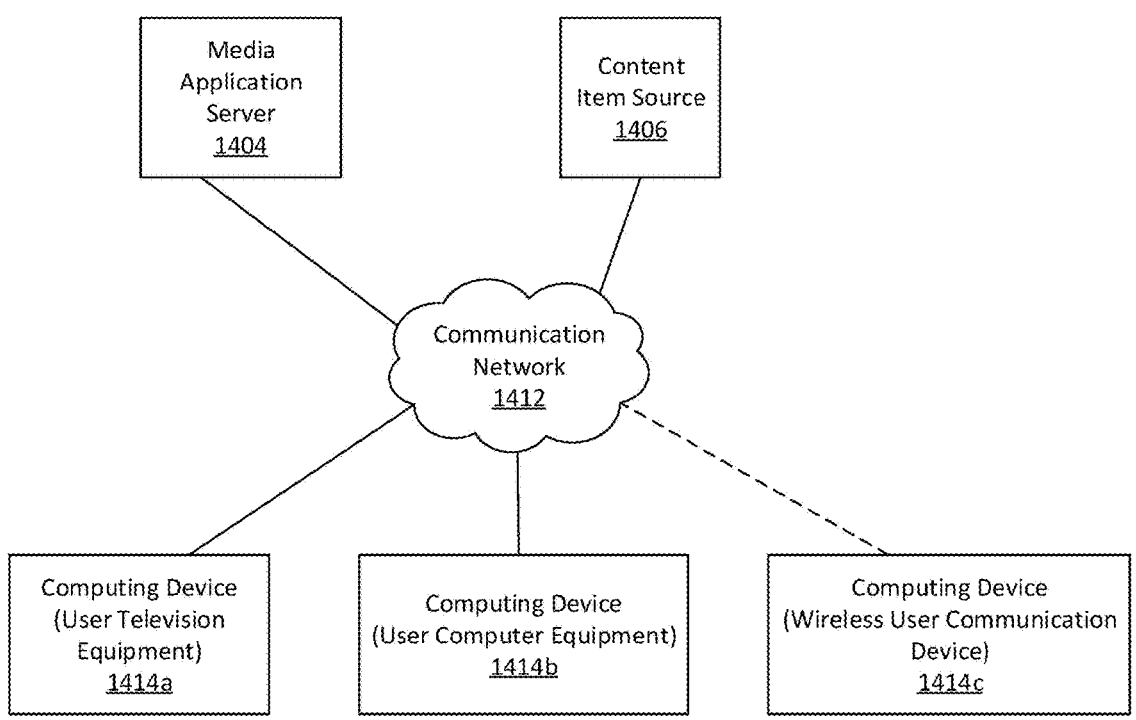
FIG. 14 depicts an illustrative block diagram of an interactive pronunciation learning system, in accordance with some embodiments of the disclosure.

FIG. 14 shows an illustrative block diagram of an interactive pronunciation learning system, in accordance with some embodiments of the disclosure. In one aspect, system 1400 includes one or more of media application server 1404, content item source 1406, and communication network 1412.

Communication network 1412 may be one or more networks including the Internet, a mobile phone network, mobile voice or data network (e.g., a 4G or LTE network), cable network, public switched telephone network, or other types of communication network or combinations of communication networks. Communication network 1412 includes one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. Communication network 1412 communicatively couples various components of system 1400 to one another. For instance, server 1404 may be communicatively coupled to video-hosting web server, content item source 1406 via communication network 1412.

Video-hosting web server (not shown) hosts one or more video websites, such as YouTube™, and/or the like, that enable users to download or stream videos, video clips, and/or other types of content. In addition to enabling users to download and view content, the video websites also provide access to data regarding downloaded content.

Content item source 1406 may store content item-related data from one or more types of content providers or originator of content (e.g., a television broadcaster, a Webcast provider, on-demand content provider, over-the-top content providers, or other providers of content). Content item source includes a content item, manifest associated with the content item, metadata associated with the content item, closed caption data or subtitles, or any other related material associated with the content item. The metadata or manifest of the content item may include, among other information of the content item, such as dialogue and associated timestamp information for each word in the dialogue. A remote media server may be used to store different types of content in a location remote from computing device 1414 (described below). Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

User data source may provide user-related data, such as user profile or preference data described herein such as preferred selection options, previous option selection, preferred content item, preferred genre, preferred characters or actors, user's friends list, to computing device 1414, server 1404 and/or video-hosting web server using any suitable approach. In some embodiments, content item source 1406 and user data source may be integrated as one device.

In some embodiments, content item data from content item source 1406 may be provided to computing device 1414 using a client/server approach. For example, computing device 1414 may pull content item data from a server (e.g., server 1404), or a server may push content item data to computing device 1414. In some embodiments, a client application residing on computing device 1414 may initiate sessions with user data source to obtain content item data when needed, e.g., when the content item data is out of date or when computing device 1414 receives a request from the user to receive data.

Content and/or content item data delivered to computing device 1414 may be over-the-top (OTT) content. OTT content delivery allows Internet-enabled user devices, such as computing device 1414, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YouTube™, Netflix™, and HULU™, which provide audio and video via IP packets. YouTube™ is a trademark owned by Google Inc., Netflix™ is a trademark owned by Netflix Inc., and Hulu is a trademark owned by Hulu™. OTT content providers may additionally or alternatively provide content item data described above. In addition to content and/or content item data, providers of OTT content can distribute applications (e.g., web-based applications or cloud-based applications), or the content can be displayed by applications stored on computing device 1414.

As described in further detail below, media application server 1404 accesses the content of the video website(s) hosted by video-hosting web server and, based on the accessed content, generates a variety of types of data such as metadata or manifest (e.g., terms, associations between terms and corresponding media content identifiers, dialogue, closed captions, subtitles, and/or the like) that can be accessed to facilitate the retrieving or searching of media content made available by content item source 1406. In some embodiments, server 1404 accesses metadata or manifest of the content item from content item source 1406. The metadata or manifest of the content item may be generated by video-hosting web server or media application server 1404. In some embodiments, the metadata or manifest of the content item may be generated by a third-party generator that has access to the content item.

System 1400 also includes one or more computing devices 1414, such as user television equipment 1414a (e.g., a set-top box), user computer equipment 1414b, and wireless user communication device 1414c (e.g., a smartphone device or a remote control), which users can use to interact with server 1404, user data source, and/or content item source 1406, via communication network 1412, to search for desired media content. For instance, in some aspects, server 1404 may provide a user interface via computing device 1414, by which a user can input a query for a particular item of media content made available by content item source 1406, and generate a response to the query by accessing and/or processing data and/or manifest. Although FIG. 14 shows one of each component, in various examples, system 1400 may include multiples of one or more illustrated components. For instance, system 1400 may include multiple video-hosting web servers and media application server 1404 may aggregate data from the multiple video websites hosted by multiple video-hosting web servers, respectively.

Figure 15:
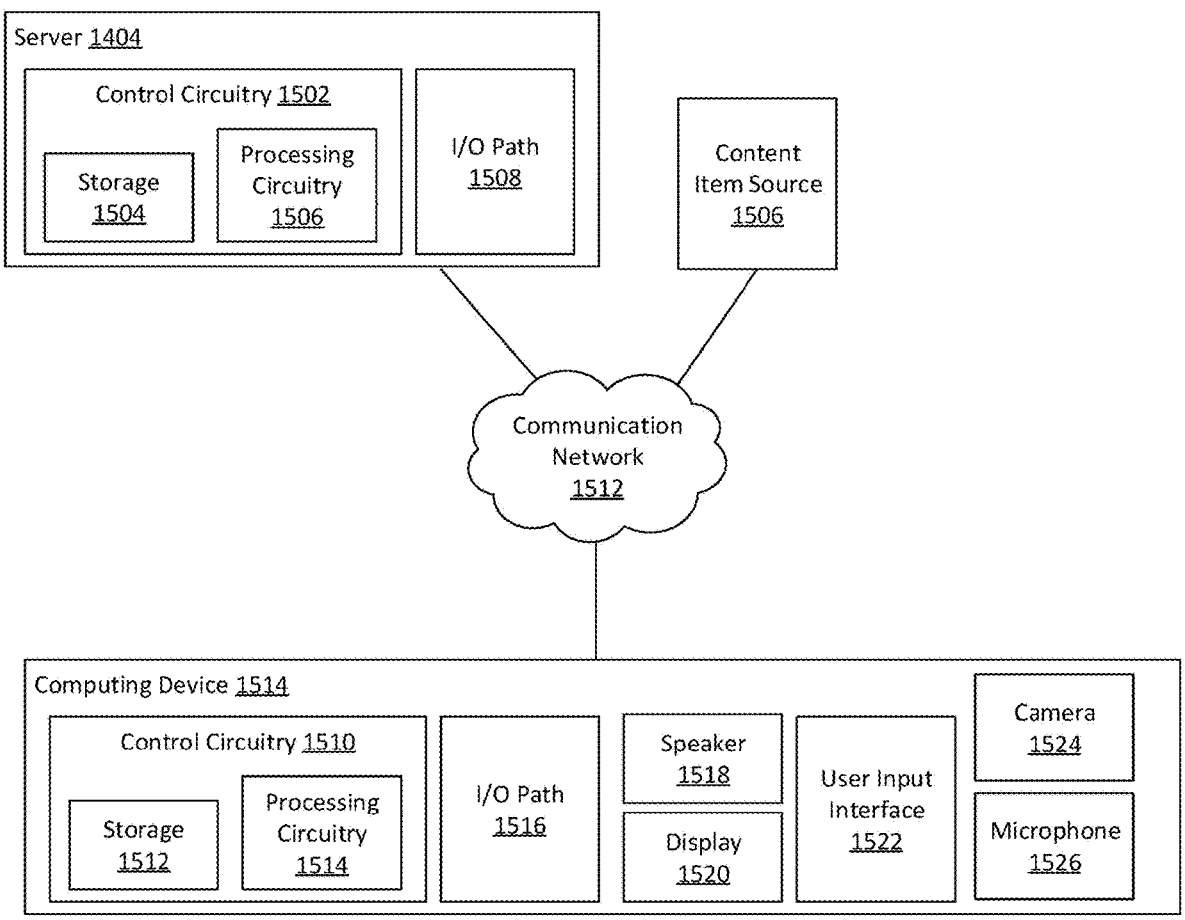
FIG. 15 depicts an illustrative block diagram showing additional details of the system of FIG. 14, in accordance with some embodiments of the disclosure.

FIG. 15 is an illustrative block diagram showing additional details of the system 1400 of FIG. 14, in accordance with some embodiments of the disclosure. In particular, server 1404 includes control circuitry 1502 and Input/Output (I/O) path 1508, and control circuitry 1502 includes storage 1504 and processing circuitry 1506. Computing device 1414 includes control circuitry 1510, I/O path 1516, speaker 1518, display 1520, camera 1524, microphone 1526, and user input interface 1522. Control circuitry 1510 includes storage 1512 and processing circuitry 214. Control circuitry 1502 and/or 1510 may be based on any suitable processing circuitry such as processing circuitry 1506 and/or 1514.

As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 1504, storage 1512, and/or storages of other components of system 1400 (e.g., storages of content item source 1406, user data source, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Each of storage 1504, storage 1512, and/or storages of other components of system 1400 may be used to store various types of content, content item data, and or other types of data. Non-volatile memory may also be used (e.g., to launch a boot-up routine and other instructions). Cloud-based storage may be used to supplement storages 1504, 1512 or instead of storages 1504, 1512.

In some embodiments, control circuitry 1502 and/or 1510 executes instructions for an application stored in memory (e.g., storage 1504 and/or 1512). Specifically, control circuitry 1502 and/or 1510 may be instructed by the application to perform the functions discussed herein. In some implementations, any action performed by control circuitry 1502 and/or 1510 may be based on instructions received from the application. For example, the application may be implemented as software or a set of executable instructions that may be stored in storage 1504 and/or 1512 and executed by control circuitry 1502 and/or 1510. In some embodiments, the application may be a client/server application where only a client application resides on computing device 1414, and a server application resides on server 1404.

The application (e.g., media application) may be implemented using any suitable architecture. For example, it may be a stand-alone application wholly implemented on computing device 1414. For example, the media application may be implemented as software or a set of executable instructions, which may be stored in non-transitory storage 1512 and executed by control circuitry 1510 of a user device 1414. In such an approach, instructions for the application are stored locally (e.g., in storage 1512), and data for use by the application is downloaded on a periodic basis (e.g., from an out-of-band feed, from an Internet resource, or using another suitable approach). Control circuitry 1510 may retrieve instructions for the application from storage 1512 and process the instructions to perform the functionality described herein. Based on the processed instructions, control circuitry 1510 may determine what action to perform when input is received from user input interface 1522.

In client/server-based embodiments, control circuitry 1510 may include communication circuitry suitable for communicating with an application server (e.g., server 1404) or other networks or servers. The instructions for carrying out the functionality described herein may be stored on the application server. Communication circuitry may include a cable modem, an integrated services digital network (ISDN) modem, a digital subscriber line (DSL) modem, a telephone modem, an Ethernet card, or a wireless modem for communication with other equipment, or any other suitable communication circuitry. Such communication may involve the Internet or any other suitable communication networks or paths (e.g., communication network 1412).

In another example of a client/server-based application, control circuitry 1510 runs a web browser that interprets web pages provided by a remote server (e.g., server 1404). For example, the remote server may store the instructions for the application in a storage device. The remote server may process the stored instructions using circuitry (e.g., control circuitry 1502) and generate the displays discussed above and below. Computing device 1414 may display the content via display 1520. This way, the processing of the instructions is performed remotely (e.g., by server 1404) while the resulting displays are provided locally on computing device 1414. Computing device 1414 may receive inputs from the user via input interface 1522 and transmit those inputs to the remote server for processing and generating the corresponding displays.

A user may send instructions to control circuitry 1502 and/or 1510 using user input interface 1522. User input interface 1522 may be any suitable user interface, such as a remote control, trackball, keypad, keyboard, touchscreen, touchpad, stylus input, joystick, voice recognition interface, or other user input interfaces. User input interface 1522 may be integrated with or combined with display 1520, which may be a monitor, a television, a liquid crystal display (LCD), electronic ink display, or any other equipment suitable for displaying visual images.

Camera 1524 of computing device 1414 may capture an image or a video. A microphone 1526 of computing device 1414 may detect sound in proximity to computing device 1414 and converts the sound to electrical signals.

Server 1404 and computing device 1414 may receive content and data via I/O paths 1508 and 1516, respectively. I/O paths 1508, 1516 may provide content (e.g., broadcast programming, on-demand programming, Internet content, content available over a local area network (LAN) or wide area network (WAN), and/or other content) and data to control circuitry 1502, 1510. Control circuitry 1502, 1510 may be used to send and receive commands, requests, and other suitable data using I/O paths 1508, 1516. I/O paths 1508, 1516 may connect control circuitry 1502, 1510 (and specifically processing circuitry 1506, 214) to one or more communication paths (described below). I/O functions may be provided by one or more of these communication paths but are shown as single paths in FIG. 15 to avoid overcomplicating the drawing.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
generating for display a content item comprising dialogue;
generating for display a plurality of selectable closed captioning words based on the dialogue;
receiving a selection of at least one selectable closed captioning word from the plurality of selectable closed captioning words; and
in response to receiving the selection, generating for playback at least a portion of the dialogue corresponding to the selected at least one selectable closed captioning word.

2. The method of claim 1, further comprising:
receiving metadata of the content item, wherein the metadata of the content item comprises at least the portion of the dialogue and a timestamp corresponding to the selected at least one selectable closed captioning word;
retrieving the selected at least one selectable closed captioning word from a database of the content item;
comparing the metadata of the content item to the selected at least one selectable closed captioning word; and
based on the comparison, determining that the at least the portion of the dialogue corresponds to the selected at least one selectable closed captioning word.

3. The method of claim 1, further comprising:
determining that a first set of words in the dialogue is within a given time period in relation to the selected at least one selectable closed captioning word;
in response to determining that the first set of words in the dialogue is within the given time period in relation to the selected at least one selectable closed captioning word, categorizing the first set of words as a first phrase;
retrieving an audio file containing a pronunciation of the first phrase in a first language;
receiving a selection of at least one word of the first set of words; and
generating for output the pronunciation of the first phrase.

4. The method of claim 1, further comprising:
receiving a vocal input corresponding to the selected at least one selectable closed captioning word;
retrieving an audio file containing a pronunciation of the selected at least one selectable closed captioning word; and
comparing the vocal input to the pronunciation to calculate a similarity score.

5. The method of claim 4, wherein:
to generate for display the content item comprising dialogue is on a first device;
to generate for display the plurality of selectable closed captioning words based on the dialogue is on the first device; and
to generate for playback the at least a portion of the dialogue corresponding to the selected at least one selectable closed captioning word is on the first device;
the method further comprising:
transmitting the vocal input to a server to enable rendering of the vocal input on a second device that is different from the first device.

6. The method of claim 1, further comprising:
in response to receiving the selection of the selected at least one selectable closed captioning word, pausing playback of the content item.

7. The method of claim 1, further comprising:
identifying that the selected at least one selectable closed captioning word is spoken by a character of the content item;
generating for display a list of one or more characters of the content item;
receiving a selection of the character from the list of one or more characters;
retrieving an audio file containing a pronunciation of the selected at least one selectable closed captioning word spoken by the character; and
generating for output the retrieved audio file containing the pronunciation of the selected at least one selectable closed captioning word spoken by the character.

8. A system comprising:
control circuitry configured to:
generate for display a content item comprising dialogue;
generate for display a plurality of selectable closed captioning words based on the dialogue;
receive a selection of at least one selectable closed captioning word from the plurality of selectable closed captioning words; and
in response to receiving the selection, generate for playback at least a portion of the dialogue corresponding to the selected at least one selectable closed captioning word.

9. The system of claim 8, the control circuitry further configured to:
receive metadata of the content item, wherein the metadata of the content item comprises at least the portion of the dialogue and a timestamp corresponding to the selected at least one selectable closed captioning word;
retrieve the selected at least one selectable closed captioning word from a database of the content item;
compare the metadata of the content item to the selected at least one selectable closed captioning word; and
based on the comparison, determine that the at least the portion of the dialogue corresponds to the selected at least one selectable closed captioning word.

10. The system of claim 8, the control circuitry further configured to:
determine that a first set of words in the dialogue is within a given time period in relation to the selected at least one selectable closed captioning word;
in response to determining that the first set of words in the dialogue is within the given time period in relation to the selected at least one selectable closed captioning word, categorize the first set of words as a first phrase;
retrieve an audio file containing a pronunciation of the first phrase in a first language;
receive a selection of at least one word of the first set of words; and
generate for output the pronunciation of the first phrase.

11. The system of claim 8, the control circuitry further configured to:
receive a vocal input corresponding to the selected at least one selectable closed captioning word;
retrieve an audio file containing a pronunciation of the selected at least one selectable closed captioning word; and
compare the vocal input to the pronunciation to calculate a similarity score.

12. The system of claim 11 wherein:
to generate for display the content item comprising dialogue is on a first device;
to generate for display the plurality of selectable closed captioning words based on the dialogue is on the first device; and
to generate for playback the at least a portion of the dialogue corresponding to the selected at least one selectable closed captioning word is on the first device;
the control circuitry further configured to:
transmit the vocal input to a server to enable rendering of the vocal input on a second device that is different from the first device.

13. The system of claim 8, the control circuitry further configured to:
in response to receiving the selection of the selected at least one selectable closed captioning word, pause playback of the content item.

14. The system of claim 8, the control circuitry further configured to:
identify that the selected at least one selectable closed captioning word is spoken by a character of the content item;
generate for display a list of one or more characters of the content item;
receive a selection of the character from the list of the one or more characters;
retrieve an audio file containing a pronunciation of the selected at least one selectable closed captioning word spoken by the character; and generate for output the retrieved audio file containing the pronunciation of the selected at least one selectable closed captioning word spoken by the character.

15. A non-transient computer readable medium containing program instructions for causing a computer to perform the steps of:
   generating for display a content item comprising dialogue;
   generating for display a plurality of selectable closed captioning words based on the dialogue;
   receiving a selection of at least one selectable closed captioning word from the plurality of selectable closed captioning words; and
   in response to receiving the selection, generating for playback at least a portion of the dialogue corresponding to the selected at least one selectable closed captioning word.

16. A non-transient computer readable medium of claim 15 further containing program instructions for causing a computer to perform the steps of:
   receiving metadata of the content item, wherein the metadata of the content item comprises at least a portion of the dialogue and a timestamp corresponding to the selected at least one selectable closed captioning word;
   retrieving the selected at least one selectable closed captioning word from a database of the content item;
   comparing the metadata of the content item to the selected at least one selectable closed captioning word; and
   based on the comparison, determining that the at least the portion of the dialogue corresponds to the selected at least one selectable closed captioning word.

17. A non-transient computer readable medium of claim 15 further containing program instructions for causing a computer to perform the steps of:
   determining that a first set of words in the dialogue is within a given time period in relation to the selected at least one selectable closed captioning word;
   in response to determining that the first set of words in the dialogue is within the given time period in relation to the selected at least one selectable closed captioning word, categorizing the first set of words as a first phrase;
   retrieving an audio file containing a pronunciation of the first phrase in a first language;
   receiving a selection of at least one word of the first set of words; and
   generating for output the pronunciation of the first phrase.

18. A non-transient computer readable medium of claim 15 further containing program instructions for causing a computer to perform the steps of:
   receiving from a vocal input corresponding to the selected at least one selectable closed captioning word;
   retrieving an audio file containing a pronunciation of the selected at least one selectable closed captioning word; and
   comparing the vocal input to the pronunciation to calculate a similarity score.

19. A non-transient computer readable medium of claim 18 wherein:
   generating for display the content item comprising dialogue is on a first device;
   generating for display the plurality of selectable closed captioning words based on the dialogue is on the first device; and
   generating for playback the at least a portion of the dialogue corresponding to the selected at least one selectable closed captioning word is on the first device;
   the non-transient computer readable medium further containing program instructions for causing a computer to perform the steps of:
     transmitting the vocal input to a server to enable rendering of the vocal input on a second device that is different from the first device.

20. A non-transient computer readable medium of claim 15 further containing program instructions for causing a computer to perform the steps of:
   identifying that the selected at least one selectable closed captioning word is spoken by a character of the content item;
   generating for display a list of one or more characters of the content item;
   receiving a selection of the character from the list of the one or more characters;
   retrieving an audio file containing a pronunciation of the selected at least one selectable closed captioning word spoken by the character; and
   generating for output the retrieved audio file containing the pronunciation of the selected at least one selectable closed captioning word spoken by the character.

* * * * *